Nov. 27, 1934. A. D. CRAIG Re. 19,380
UNDERGARMENT
Original Filed July 20, 1932
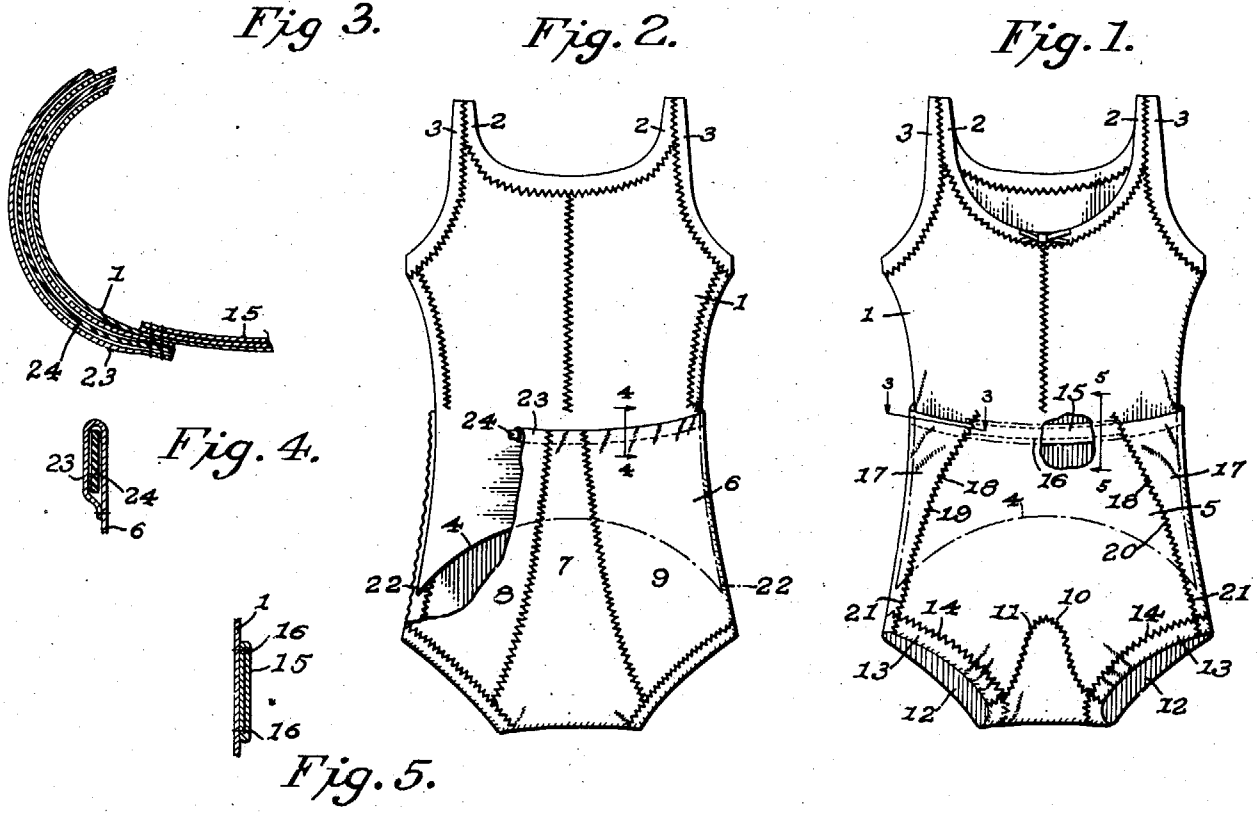
Witness
H. E. Van Dine
Inventor
Allan D. Craig
by his attorneys
Fish Hildreth Carey & Jenney Reissued Nov. 27, 1934

Re. 19,380

UNITED STATES PATENT OFFICE 19,380

UNDERGARMENT

Allan D. Craig, Watertown, Mass., assignor to Thomas Dalby, Inc., Watertown, Mass., a corporation of Massachusetts Original No. 1,911,676, dated May 30, 1933, Serial No. 623,643, July 20, 1932. Application for reissue June 5, 1934, Serial No. 729,164

5 Claims. (Cl. 2—78)

This invention relates to improvements in undergarments particularly adapted for children but also applicable to garments for adults.

Objects of the invention are to provide an improved union suit of the type having a drop seat provided with an elastic to hold the same in normal closed position, to provide an improved undergarment of the general character referred to that will afford ample freedom and exposure in the lowering of the drop seat while at the same time avoiding objectionable constriction by the elastic element and tightness at the waist line, and which will be of a durable, satisfactory nature.

Important novel characteristics of the invention reside in the special construction of drop seat provided with lateral extensions extending around over the front of the garment, closing the same at the sides and seamed to the front to form therewith a continuous front structure by seams extending from the sides of the leg openings and converging upwardly, and in the provision of a transversely extending inelastic strip portion secured to the front inwardly of the side edges thereof at the waist line and the connection of the end portions of the elastic to said inelastic strip portion.

The invention, with other objects and advantages thereof, and the particular construction, combination and arrangement of parts comprising the same, will be understood from the hereinafter contained detailed description when considered in connection with the accompanying drawing forming part hereof and illustrating one embodiment of the invention.

In the drawing, Fig. 1 is a front elevation of an undergarment constructed in accordance with the present invention; Fig. 2 is a rear elevation, with parts broken away; Fig. 3 is a fragmentary horizontal section, on an enlarged scale, taken on the line 3—3 of Fig. 1, looking in the direction of the arrows; Fig. 4 is a detail section, on an enlarged scale, on the line 4—4 of Fig. 2; and Fig. 5 is a detail section, on an enlarged scale, on the line 5—5 of Fig. 1.

Referring to a detailed description of the particular embodiment of the invention illustrated in the drawing, the construction shown comprises a body portion 1 made of tubular knitted or woven material with the wales running longitudinally to permit the same to stretch laterally but not longitudinally. The upper portion of the garment is provided with a pair of shoulder straps shown formed of folded binding material or tapes 2, 3, stitched together at their edges, said binding material or tapes being extended and secured respectively to the edge of the neck portion and to the edges of the arm holes of the body 1.

The back of the body 1 is cut away at 4 just below the waist line. The front of the body is extended to form a lower front section 5. To the lower end of this front section 5 is connected a drop seat designated as a whole 6, the same being shown, in the present instance, as made up of a central crotch part 7 and parts 8, 9, one on either side thereof, said parts being stitched together along their meeting edges.

The central crotch part 7 is wider at its lower portion and projects forwardly of the parts 8, 9, the lower portion of the same fitting into a cut-out portion 10 of the lower front section 5 and being connected thereto by stitching 11. The lower portion of the lower front section 5 and the adjoining portion of the drop seat 6 have cut-out portions in their side edges providing leg openings 12, the edges of which are finished by folded binding tapes 13 secured thereto by stitching 14, the ends of the binding tape 13 of each leg opening being secured together by continuations of the stitching 11.

To the front of the garment at the waist line, inwardly of its side edges, is secured an inelastic strip portion 15. The inelastic strip portion 15 is shown as formed of a piece of inelastic knit tubing secured by stitching 16 to the front at the under side thereof. The drop seat 6 is provided at the sides with lateral extensions 17, said lateral extensions gradually increasing in width upwardly from their lower ends, the same being approximately triangular shape with inclined side edge portions 18.

The lateral extensions 17 extend forwardly over the lower front section 5, their inclined edge portions 18 converging upwardly to the end portions of the inelastic strip portion 15 and being secured thereto and to the front by upwardly converging lines of stitching 19, 20. Relatively short lower side edge portions of the drop seat 6 are secured by continuations of the stitching 19, 20, to lower edge portions 21 of the lower front section 5, up to the points marked 22, and from thence on the lateral extensions 17 of the drop seat are seamed to the front by the stitching 19, 20, which is shown extending through and slightly above the inelastic strip portion 15.

The drop seat 6, which is cut full to loosely fit over the hips of the wearer, is provided at its upper edge with a hem 23 within which is enclosed a suitable elastic 24, said hem at its end portions and the end portions of the elastic 24 being secured to the end portions of the inelastic strip portions 15. The elastic 24 serves to hold the drop seat in normal closed position, yet permitting it to be dropped when desired by merely stretching the elastic, all buttons and other fastening means being eliminated.

It will be noted that the particular construction hereinbefore set forth with the drop seat having the lateral extensions seamed to the front by upwardly converging lines of stitching, and with the elastic extending around to the front with its end portions secured to the end portions of the inelastic strip portion, provides for freely and amply lowering the drop seat without strain on the garment while at the same time constriction by the elastic and tightness, when the drop seat is in closed position, is avoided. The lateral extensions of the drop seat seamed to the front form therewith an unbroken front, the resulting structure being of a durable satisfactory nature.

While a specific embodiment of the invention is illustrated in the drawing, it will of course be understood that minor changes and modifications may be made in the particular construction shown, and the invention may be embodied in other forms, as will appeal to those skilled in the art and falling within the scope of the appended claims, without departing from the spirit of the invention.

What I claim is:

1. An undergarment comprising upper and lower front sections, an upper back section, and a drop seat portion extending from the lower end of the lower front section, the lower front section and the drop seat portion having cutout portions in their side edges and having their side edges secured together at the ends of said cutout portions to form leg openings, said drop seat portion being provided at its sides above said cutout portions with lateral extensions extending forwardly over the lower front section, said lateral extensions gradually increasing in width upwardly and having upwardly converging side edge portions secured to the lower front section by upwardly converging lines of stitching, the drop seat being free throughout its upper end intermediate said converging lines of stitching and said drop seat portion being provided with an elastic at its upper edge to hold said drop seat in normal closed position.

2. An undergarment comprising a front including upper and lower sections, an upper back section, and a drop seat portion extending from the lower end of the lower front section, the front having secured thereto at the waist line inwardly of its side edges a transversely extending inelastic strip portion, the lower front section and the drop seat portion having cutout portions in their side edges and having their side edges secured together at the ends of said cutout portions to form leg openings, said drop seat portion being provided above said cutout portions with lateral extensions extending forwardly over the lower front section, said lateral extensions gradually increasing in width upwardly and having upwardly converging side edge portions secured to the lower front section and to said inelastic strip portion by upwardly converging lines of stitching, the drop seat being free throughout its upper end and intermediate said converging lines of stitching, and said drop seat being provided with an elastic at its upper edge to hold the same in normal closed position, said elastic being secured at its ends to said inelastic strip portion.

3. An undergarment comprising upper and lower front sections, an upper back section, and a drop seat portion extending from the lower end of the lower front section, said drop seat portion being provided at its sides with lateral extensions extending forwardly over the lower front section and permanently secured to the lower front section inwardly of the side edges thereof by stitching, said drop seat being free throughout its upper end intermediate the stitching securing its lateral extensions to the front section, and said drop seat portion being provided with an elastic at its upper edge to hold said drop seat in normal closed position.

4. An undergarment comprising upper and lower front sections, an upper back section, a drop seat section extending from the lower end of the lower front section, said drop seat section being provided at its sides with lateral extensions extending forwardly over the lower front section, the lower front section and the drop seat section being secured together to form leg openings, and an elastic attached to the upper edge of the drop seat section throughout the length of said upper edge, the elastic extending materially forwardly of the sides of the garment and attached at its ends to the lower front section between the sides and middle thereof.

5. An undergarment comprising upper and lower front sections, an upper back section, a drop seat portion extending from the lower end of the lower front section, said drop seat portion being provided at its sides with lateral extensions extending forwardly over the lower front section, an elastic attached to the upper edge of the drop seat section throughout the length of said upper edge, and an inelastic strip attached to the lower front section and extending on both sides of the middle thereof and terminating materially forwardly of the sides of the garment, the elastic being attached at its ends to the inelastic strip.

ALLAN D. CRAIG.